(12) United States Patent
Lauder et al.

(10) Patent No.: US 6,392,790 B1
(45) Date of Patent: May 21, 2002

(54) BI-DIRECTIONAL AMPLIFIER

(75) Inventors: Richard Lauder, Maroubra; Jennifer Bryce, Potts Point, both of (AU)

(73) Assignee: Redfern Broadband Networks Inc., Wilmington, DE (US)

( * ) Notice: Subject to any disclaimer, the term of this patent is extended or adjusted under 35 U.S.C. 154(b) by 0 days.

(21) Appl. No.: 09/826,285

(22) Filed: Apr. 4, 2001

(51) Int. Cl.$^7$ .................................................. H01S 3/00
(52) U.S. Cl. ..................................... 359/341.2; 359/337
(58) Field of Search ........................... 359/341.2, 341.1, 359/337

(56) References Cited

U.S. PATENT DOCUMENTS

| | | | | |
|---|---|---|---|---|
| 5,604,627 A | * | 2/1997 | Kohn | 359/341 |
| 5,875,054 A | * | 2/1999 | Onada et al. | 359/341 |
| 2001/0019449 A1 | * | 9/2001 | Krummrich | 359/341.2 |

FOREIGN PATENT DOCUMENTS

EP      0 889 562 A2  *  7/1999

* cited by examiner

*Primary Examiner*—Mark Hellner
(74) *Attorney, Agent, or Firm*—Christie, Parker & Hale, LLP

(57) ABSTRACT

A bi-directional optical amplifier arrangement for use in an optical path along which a bi-directional optical signal is travelling, the arrangement comprising at least two amplifier units disposed to amplify, in use, in different propagation directions, at least two propagation direction dependent optical junction elements, at least two optical paths disposed in parallel between the junction elements, wherein each optical paths comprises one of the amplifier units; and wherein gain settings of the amplifier units are chosen in a manner such that, in use, a total gain experienced by an optical signal re-circulating along both optical paths is less than unity.

12 Claims, 4 Drawing Sheets

BI-DIRECTIONAL AMPLIFIER

FIELD OF THE INVENTION

The present invention relates broadly to an optical amplifier arrangement for use in an optical path along which a bi-directional optical signal is travelling, and to an optical network incorporating such an optical amplifier arrangement.

BACKGROUND OF THE INVENTION

FIG. 1 illustrates how a bi-directional amplifier arrangement 10 may be implemented. The bi-directional amplifier arrangement 10 comprises two unidirectional amplifiers 12, 14, 3-port optical circulators 18, 20 are used as optical junction elements at either end of the amplifier arrangement 10. Isolators e.g. 16 impart additionally the directionality of the bi-directional amplifier arrangement 10.

In the bi-directional amplifier arrangement 10 no protection against the optical field undergoing dual reflective events 22, 24 after the optical circulators 18, 20 respectively is provided. Therefore, the optical field can potentially fully circulate within the amplifier arrangement 10. In the case where the re-circulation pass gain experienced is higher than the loss from the dual reflective events 22, 24, lasing or instability will occur which can severely impair the performance of the amplifier arrangement 10.

FIG. 2 provides an illustration of how this problem may be overcome. In particular, the arrangement 50 utilises filter elements 32, 34 in the respective optical paths 26, 28 of the amplifier arrangement 50, whereby only a preselected wavelength e.g. ($\lambda_1$ in the case of filter 32 and e.g. $\lambda_2$ in the case of filter 34) can propagate along the respective optical paths 26, 28. However, in order to prevent lasing such an amplifier arrangement must be configured such that no wavelength can propagate along both optical paths, which means that the direction of amplification of the resulting amplifier arrangement is wavelength dependent. Therefore, this solution is not well suited for use in optical networks in which the propagation direction of optical signals within the optical network is not wavelength dependent, i.e. in optical networks that provide a higher flexibility in the bi-directional data transmission.

Furthermore, the filter elements 32, 34 may cause degradation of the optical signals passing through them due to, e.g. their dispersion characteristics. In an optical network or transmission link employing a plurality of amplifiers using the arrangement 50, this degradation may accumulate, resulting in the signal becoming unrecoverable at the receiver.

At least preferred embodiments of the present invention seek to provide an alternative bi-directional amplification arrangement.

SUMMARY OF THE INVENTION

In accordance with a first aspect of the present invention there is provided a bi-directional optical amplifier arrangement for use in an optical path along which a bi-directional optical signal is travelling, the arrangement comprising at least two amplifier units disposed to amplify, in use, in different propagation directions, at least two propagation direction dependent optical junction elements at least two optical paths disposed in parallel between the junction elements, wherein each optical paths comprises one of the amplifier units; and wherein gain settings of the amplifier units are chosen in a manner such that, in use, a total gain experienced by an optical signal re-circulating along both optical paths is less than unity.

The amplifier arrangement may further comprise at least one optical isolator element disposed along each of the optical paths, for enhancing the directionality of the respective optical paths.

Advantageously, the junction elements each comprise an optical circulator. The optical circulator is preferably a blocking optical circulator.

In a preferred embodiment, the gain settings of the optical amplifier units are chosen such that the sum of the gain settings is less than the maximum loss associated with reflection directly at the junction element.

The respective gain settings of the amplifier units may be symmetric or asymmetric.

In one embodiment, the amplifier arrangement further comprises at least one filter element disposed along each of the optical paths for selectively amplifying components of the bi-directional optical signal. The filter elements in the respective paths may be incorporated in the respective amplifier units.

In accordance with a second aspect of the present invention there is provided an optical network comprising an optical amplifier arrangement, in accordance with the first aspect of the present invention.

Preferably, the optical network comprises at least one pair of network nodes, wherein the amplifier arrangement is disposed between the network nodes.

The optical network may comprise a bi-directional WDM network. Preferably, the WDM network is a dense WDM network.

DETAILED DESCRIPTION OF THE EMBODIMENTS

Figure 3:
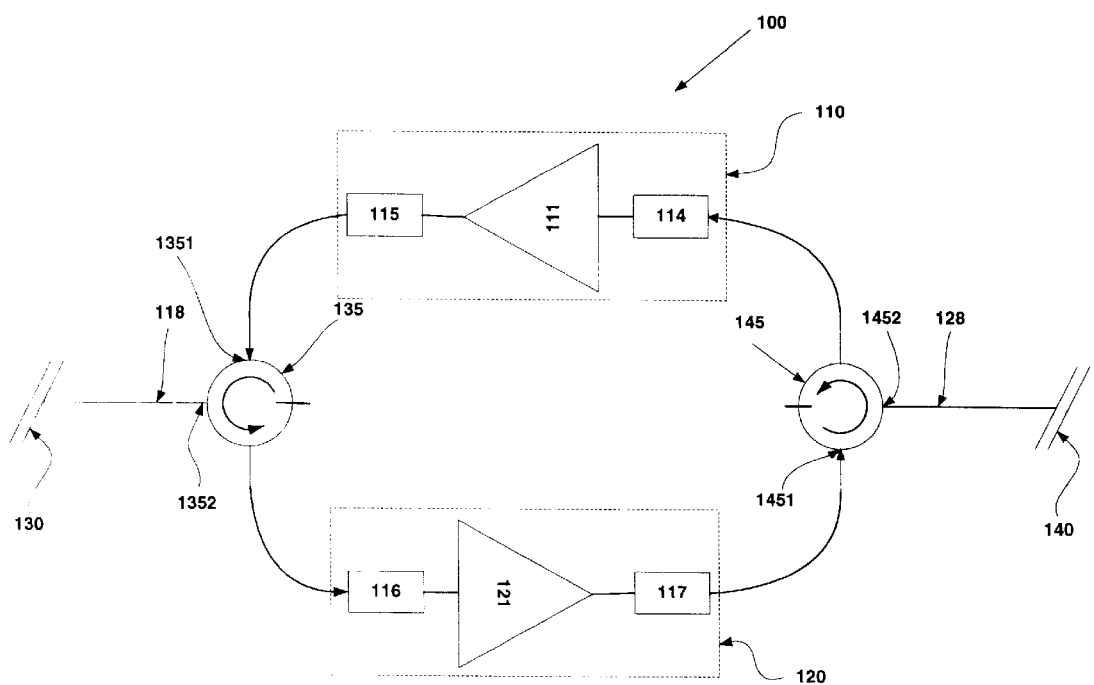
FIG. 3 provides an illustration of a bidirectional optical amplifier structure according to the present invention.

FIG. 3 shows a bidirectional optical amplifier arrangement 100 consisting of two unidirectional amplifier modules 110 and 120. The gain settings for each of the two amplifier 111, 121 modules are $G_{111}$ and $G_{121}$, respectively. Also associated with each of the amplifier modules, 110 and 120, are filters. The arrangement 100 shows two filters to be associated with each of the two amplifier modules 110 and 120. In the case of the amplifier module 110 the filters are 114 and 115, respectively, while in the case the amplifier module 120 the filters are 116 and 117, respectively. The insertion losses associated with each of these filters are $L_{114}$, $L_{115}$, $L_{116}$ and $L_{117}$, respectively. These filters can be, for example gratings used as signal filters, thin film filters used to add and drop an optical supervisory or management channel, or any other type of filtering that would be appropriate for use in the arrangement 100.

Figure 1:
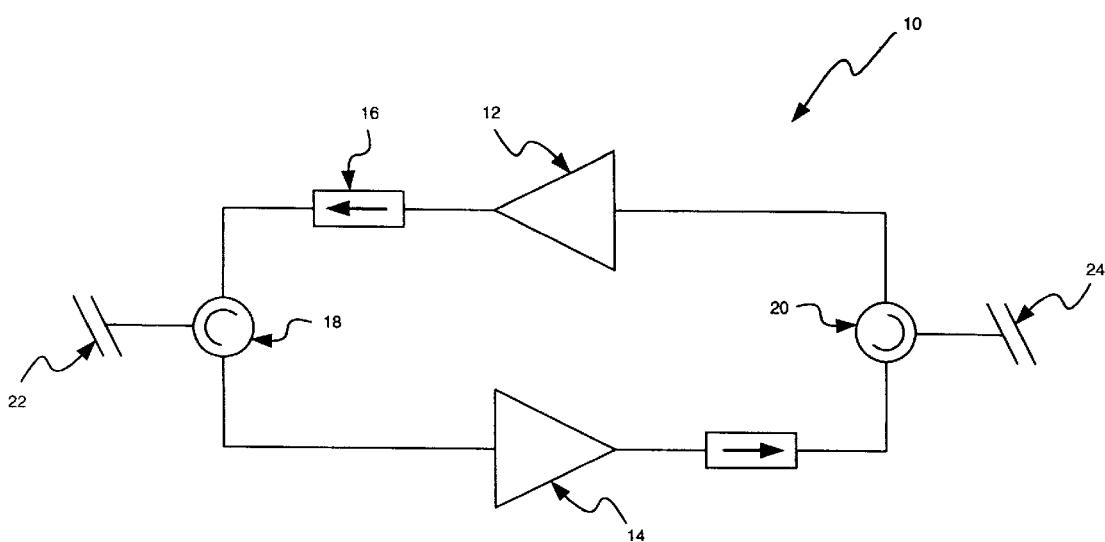
FIG. 1 provides an illustration of prior art bidirectional optical amplifier structure.

In the arrangement 100 the two amplifier modules 110 and 120 are positioned in two parallel optical paths 127, 137 disposed in parallel between two three port optical circulators 135, 145. The optical circulators 135 and 145 in the embodiment shown in FIG. 1 are blocking (i.e. not fully-circulating) optical circulators.

Figure 2:
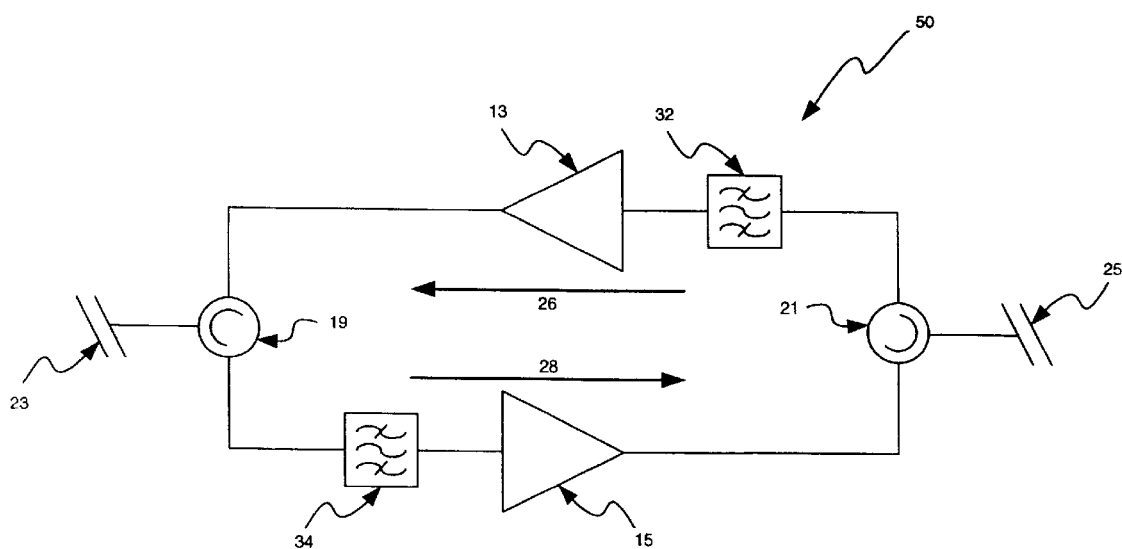
FIG. 2 provides an illustration of an optical amplifier structure where undesired lasing or instability can be prevented.

In the following, it will be described how undesired lasing or instability is prevented in the arrangement 100 where e.g. two reflective events 130 and 140 occur. The reflective events 130 and 140 can be, for example, a result of a bad splice or connector. Light that is reflected at the reflective events 130 or 140 will effectively re-circulate through the arrangement 100 as previously described with reference to FIGS. 1 and 2. In the arrangement 100, a number of elements contribute to losses experienced by re-circulating light. In particular, the actual reflective processes 130 and 140 lead to losses denoted $L_{130}$ and $L_{140}$, respectively. These losses represent the fraction of light which is back reflected (i.e. causing the re-circulation). Additionally, in the optical circulators 135 and 145 port to port insertion losses are experienced. The losses resulting from the circulator ports are denoted $L_{1351}$, $L_{1352}$, $L_{1451}$ and $L_{1452}$, and are associated with ports 1351, 1352, 1451 and 1452, respectively.

Furthermore, the light experiences other losses in the form of optical fibre losses due to attenuation. The reflective events 130, 140 and the optical circulators 135, 145 are linked by optical fibre lengths 118 and 128. When a signal is transmitted along these fibre lengths 118, 128 losses due to attenuation will contribute to the total loss in the re-circulating signals. The losses in each of these fibre lengths 118 and 128 are denoted $L_{118}$ and $L_{128}$, respectively.

In order to understand the operation of the bidirectional optical amplifier arrangement 100 it is desirable to follow the path of a signal in this arrangement 100. If the gains and losses are expressed in decibels (dB), then starting at the input to the amplifier 111 and following the signal around the bidrectional optical amplifier arrangement 100 the total gain experienced by the signal can be expressed as:

$$\text{Gain (dB)} = G_{111} - L_{115} - L_{1351} - L_{118} - L_{130} - L_{118} - L_{1352} - L_{116} + G_{121} - L_{117} - L_{1451} - L_{128} - L_{140} L_{128} - L_{1452} - L_{114} \quad (1)$$

When the total gain is unity, i.e. 0 dB, lasing will occur, and as mentioned above, this is highly undesirable. Therefore, to prevent lasing in the arrangement 100 the following condition has been met:

$$\text{Gain} < 0 \text{ dB} \quad (2)$$

The expression (2) can also be given in the form:

$$G_{111} + G_{121} - L_{114} - L_{115} - L_{116} - L_{117} - L_{1351} - L_{1352} - L_{1451} - 2L_{118} - 2L_{128} - L_{130} - L_{140} < 0 \text{ dB} \quad (3)$$

Thus in the preferred embodiment of the present invention an essential requirement which can prevent the bidirectional optical amplifier arrangement 100 from lasing is ensuring that the above condition (3) has been met.

In meeting the above condition (3) and preventing the bidirectional optical amplifier arrangement 100 from lasing, it is considered that the losses are minimal and thus the total gain is maximum, i.e. it was designed to prevent parasitic lasing even in a worst case scenario.

Figure 4:
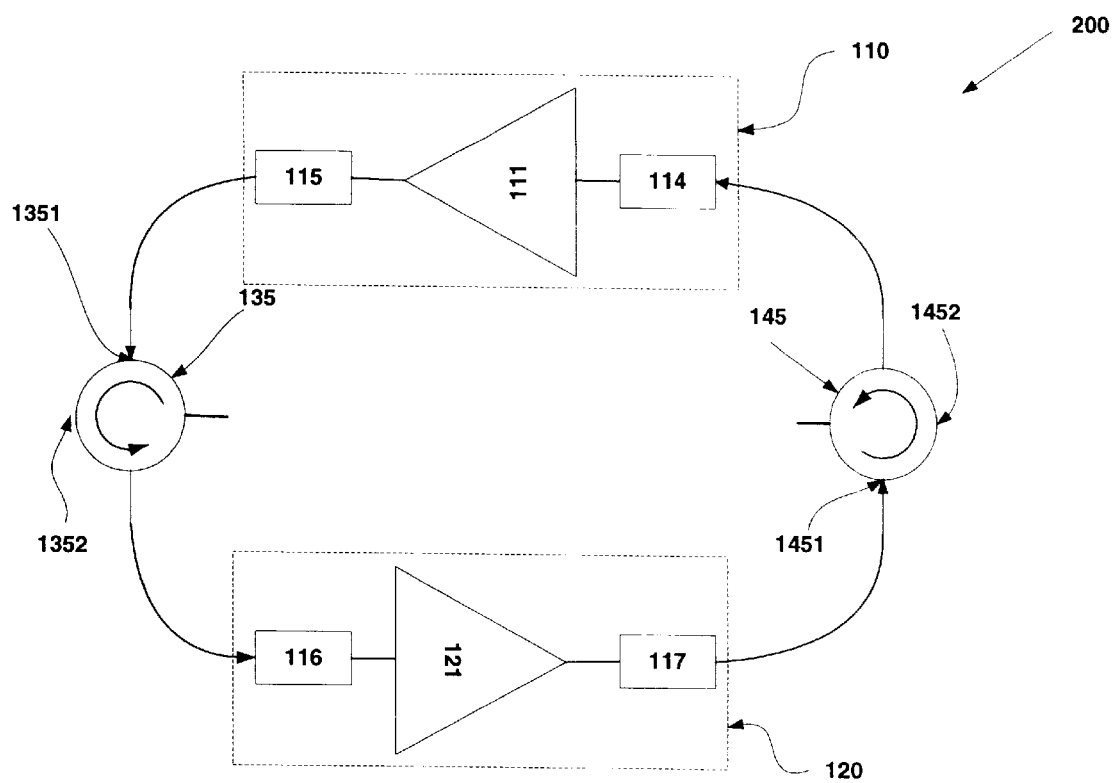
FIG. 4 provides an illustration of a preferred embodiment of the present invention.

FIG. 4 shows an illustration of the worst case scenario. In this scenario, the reflective processes 130 and 140 occur directly at the optical circulator ports 1352 and 1452, respectively. Thus there are no additional attenuation losses in length of fibres between the reflective events and the optical circulators (compare FIG. 3).

Also, the minimum loss due to the reflective events that can be experienced at ports 1352 and 1452 is 14 dB, which is the maximum reflection due to Fresnel reflection at any interface. As such with these considerations in mind the condition that has been met to prevent the bidirectional optical amplifier arrangement 200 from lasing becomes:

$$G_{111} + G_{121} < L_{114} + L_{115} + L_{116} + L_{117} + L_{1351} + L_{1352} + L_{1451} L_{1452} + 28 \text{ dB} \quad (4)$$

It has to be noted that typically amplifiers for optical network applications are designed such that they provide a high gain at a best possible performance. Currently, the gain of many commercially available amplifiers is therefore generally greater than 20 dB. As will be readily appreciated by a person skilled in the art, unless the losses experienced in the case of re-circulation (see equation 4 above) are unrealistically high, a bi-directional amplifier structure utilising such commercially available amplifiers would not satisfy condition (4). Accordingly, in the bi-directional optical amplifier arrangement 200 embodying the present invention, the amplifiers 111, 121 are chosen to have gains of less than 20 dB. It will be appreciated by a person skilled in the art that this can be effected through specifically designed amplifiers, or alternatively through suitable modification of commercially available amplifiers having a greater gain. Such modification may comprise e.g. the addition of optical attenuators within the amplifiers 111, 121. Preferably any optical attenuation is added following the gain section of the amplifiers, so that the noise figure of each amplifier is not adversely affected by the modification.

Furthermore, it should be noted that the gain $G_{111}$ and $G_{121}$ of the amplifiers 111 and 121 need not be equal, i.e. it might be advantageous in a certain embodiment of the invention to have the two gain settings $G_{111}$ and $G_{121}$ to have different values and therefore, providing an asymmetric bidirectional optical amplifier arrangement.

In addition it should be noted that the above condition (4) is preferably satisfied for all amplified spontaneous emission (ASE) and signal wavelengths that may circulate through the amplifier arrangement. This will ensure that lasing does not occur in the amplifier at any wavelength.

It will be appreciated by the person skilled in the art that numerous variations and/or modifications may be made to the present invention as shown in specific embodiments without departing from the spirit or scope of the invention as broadly described. The present embodiments are, therefore, to be considered in all respects to be illustrative and not restrictive.

What is claimed is:

1. A bi-directional optical amplifier arrangement for use in an optical path along which a bi-directional optical signal is travelling, the arrangement comprising:
   at least two amplifier units disposed to amplify, in use, in different propagation directions,
   at least two propagation direction dependent optical junction elements,
   at least two optical paths disposed in parallel between the junction elements, wherein each optical paths comprises one of the amplifier units; and
   wherein gain settings of the amplifier units are chosen in a manner such that, in use, a total gain experienced by an optical signal re-circulating along both optical paths is less than unity.

2. An arrangement as claimed in claim 1, wherein the amplifier arrangement further comprises at least one optical isolator element disposed along each of the optical paths, for enhancing the directionality of the respective optical paths.

3. An arrangement as claimed in claim 1, wherein the junction elements each comprise an optical circulator.

4. An arrangement as claimed in claim 3, wherein each optical circulator is a blocking optical circulator.

5. An arrangement as claimed in claim 1, wherein the gain settings of the optical amplifier units are chosen such that the sum of the gain settings is less than the maximum loss associated with reflection directly at the junction element.

6. An arrangement as claimed in claim 1, wherein the respective gain settings of the amplifier units are symmetric or asymmetric.

7. An arrangement as claimed in claim 1, wherein the amplifier arrangement further comprises at least one filter element disposed along each of the optical paths for selectively amplifying components of the bi-directional optical signal.

8. An arrangement as claimed in claim 7, wherein the filter elements in the respective paths are incorporated in the respective amplifier units.

9. An optical network comprising an optical amplifier arrangement as defined in claim 1.

10. An optical network as claimed in claim 9, wherein the optical network comprises at least one pair of network nodes, wherein the amplifier arrangement is disposed between the network nodes.

11. An optical network as claimed in claim 9, wherein the optical network comprises a bi-directional WDM network.

12. An optical network as claimed in claim 11, wherein the WDM network is a dense WDM network.

* * * * *